US006473410B1

(12) United States Patent
Sakoda et al.

(10) Patent No.: US 6,473,410 B1
(45) Date of Patent: Oct. 29, 2002

(54) COMMUNICATION METHOD AND APPARATUS IN WHICH FIRST AND SECOND CONTROL CHANNELS OPERATE AS AN INITIAL ACQUISITION CHANNEL AND A BROADCAST CHANNEL, RESPECTIVELY

(75) Inventors: Kazuyuki Sakoda, Tokyo; Mitsuhiro Suzuki, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/156,502

(22) Filed: Sep. 18, 1998

(30) Foreign Application Priority Data

Sep. 22, 1997 (JP) .............................................. 9-257312

(51) Int. Cl.⁷ ............................................... H04J 13/00
(52) U.S. Cl. ......................... 370/330; 370/347; 375/134
(58) Field of Search ................................ 375/132, 134, 375/137; 370/330, 337, 347, 350; 455/450, 452

(56) References Cited

U.S. PATENT DOCUMENTS

| 4,677,617 A | | 6/1987 | O'Connor et al. .......... 370/100 |
| 5,381,443 A | | 1/1995 | Borth et al. ..................... 375/1 |
| 5,537,434 A | * | 7/1996 | Persson et al. ............. 375/202 |
| 5,896,375 A | * | 4/1999 | Dent et al. ................... 370/347 |
| 6,041,046 A | * | 3/2000 | Scott et al. .................. 370/319 |
| 6,298,081 B1 | * | 10/2001 | Almgren ...................... 375/132 |

FOREIGN PATENT DOCUMENTS

| EP | 0650304 | 4/1995 | ............ H04Q/7/20 |
| WO | 9506377 | 3/1995 | ........... H04L/27/30 |

* cited by examiner

Primary Examiner—Steven Nguyen
Assistant Examiner—Duc Duong
(74) Attorney, Agent, or Firm—Jay H. Maioli (57) ABSTRACT

In a base station of a wireless telephone system, the control channel is set efficiently. A channel group for control information communication is provided as a channel to transmit from a base station in addition to the channel for information communication TCE with the terminal device. Among the channel group for control information communication, the frequency channel where the initial acquisition channel ICH exists is fixed to a predetermined frequency channel, and the time slot in which the initial acquisition information is transmitted is set by a predetermined random number sequence among the frequency channels assigned to the initial acquisition channel ICH to store the set random number information in the initial acquisition information to be transmitted. Then, the time slot in which the initial acquisition channel is transmitted is determined based on the random number obtained by receiving the frequency channel where the initial acquisition channel ICH exists at the terminal device.

11 Claims, 8 Drawing Sheets

COMMUNICATION METHOD AND APPARATUS IN WHICH FIRST AND SECOND CONTROL CHANNELS OPERATE AS AN INITIAL ACQUISITION CHANNEL AND A BROADCAST CHANNEL, RESPECTIVELY

BACKGROUND OF THE INVENTION

1. Field of the Invention

This invention relates to a communication method, a transmitting method, a receiving method, and a base station and terminal devices based on these methods, and more particularly, is applicable to a case where the time division multiplex access (TDMA) method is used.

2. Description of the Related Art

Various wireless telephone systems for wireless transmitting a signal converted into digital data have been put to a practical use. A system to which the TDMA method is applied has been put to a practical use as one of the methods of access efficiently. This method sections one transmission band (frequency channel) by time axis to form time slots and assigns each time slot to a plurality of terminal devices, so that a plurality of terminal devices can access to a base station with one transmission band.

Figure 1:
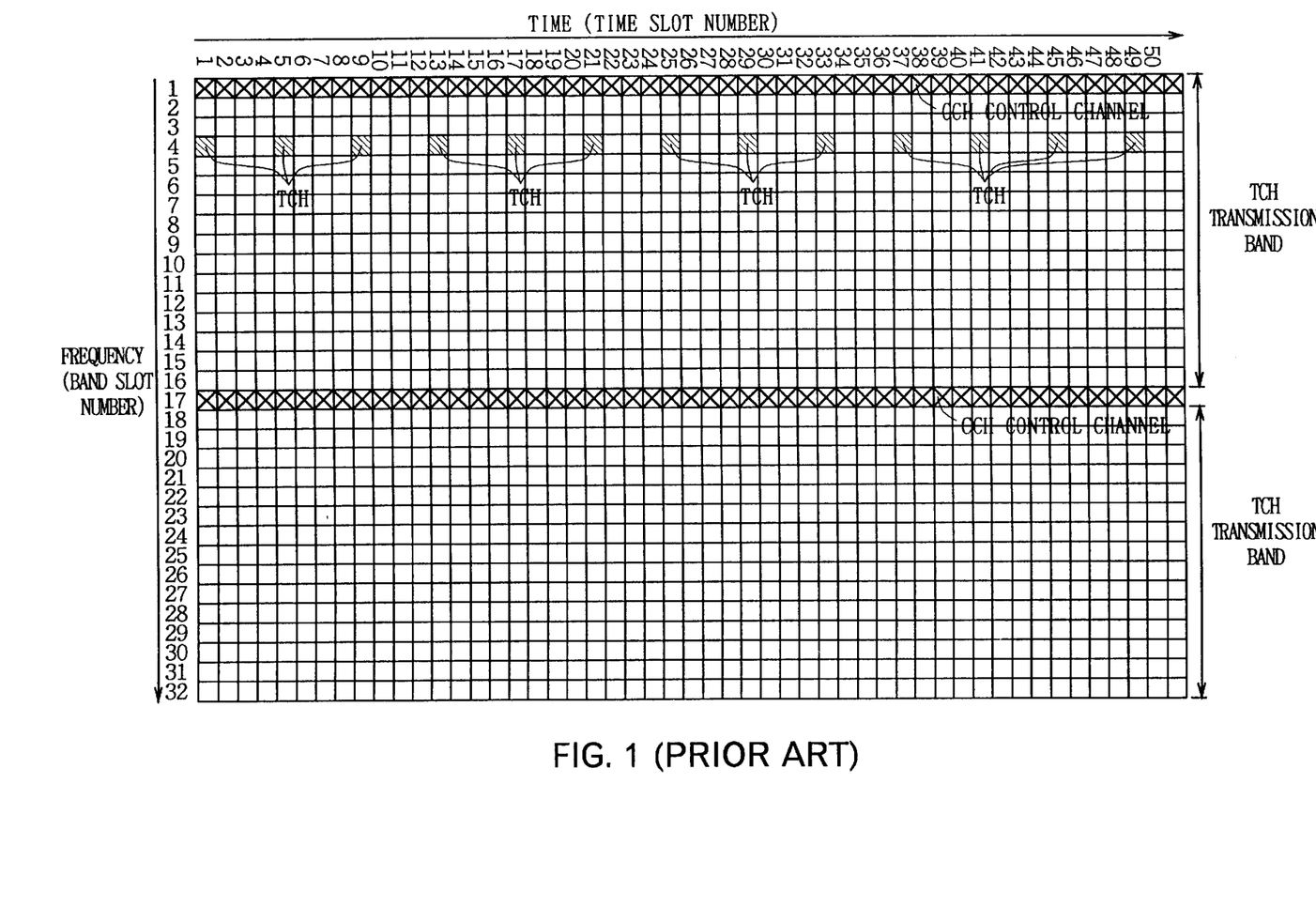
FIG. 1 is a diagram explaining an example of the channel construction of a conventional cellular system.

FIG. 1 is a diagram showing an example of the channel construction of a down circuit, through which a signal is transmitted from th e base station to the terminal device, in the conventional wireless telephone system of the cellular system to which the TDMA method is applied. The ordinate represents frequency and the abscissa represents the passage of time. The frequency axis forms one band slot for each predetermined frequency band (e.g., for each several KHz), each having band slot number (consecutive number). The time axis forms one time slot for each predetermined time (e.g., for each several hundred $\mu$ sec. each having time slot number (consecutive number).

In FIG. 1, sixteen band slots are set as a transmission band controlled by one control channel, and a band slot for common control channel CCH is assigned to the first band slot of sixteen band slots, and the seventeenth band slot___. In the band slot for control channel CCH, all time slots are only used for control channel.

Then, fifteen band slots following each control channel (e.g., the second to sixteenth band slots) are set to a transmission band for traffic channel TCH which transmits voice for telephone call or various data. The setting of the traffic channel TCH in the transmission band is informed from the base station to each terminal device through the control channel. Accordingly, in the case of accessing to the base station, each terminal device firstly receives the band slot in which the control channel CCH is transmitted to determine the band slot and time slot assigned to the terminal device from the control information designated by the control channel CCH transmitted in this band slot, and starts to communicate with the base station in the band slot and time slot.

Figure 8:
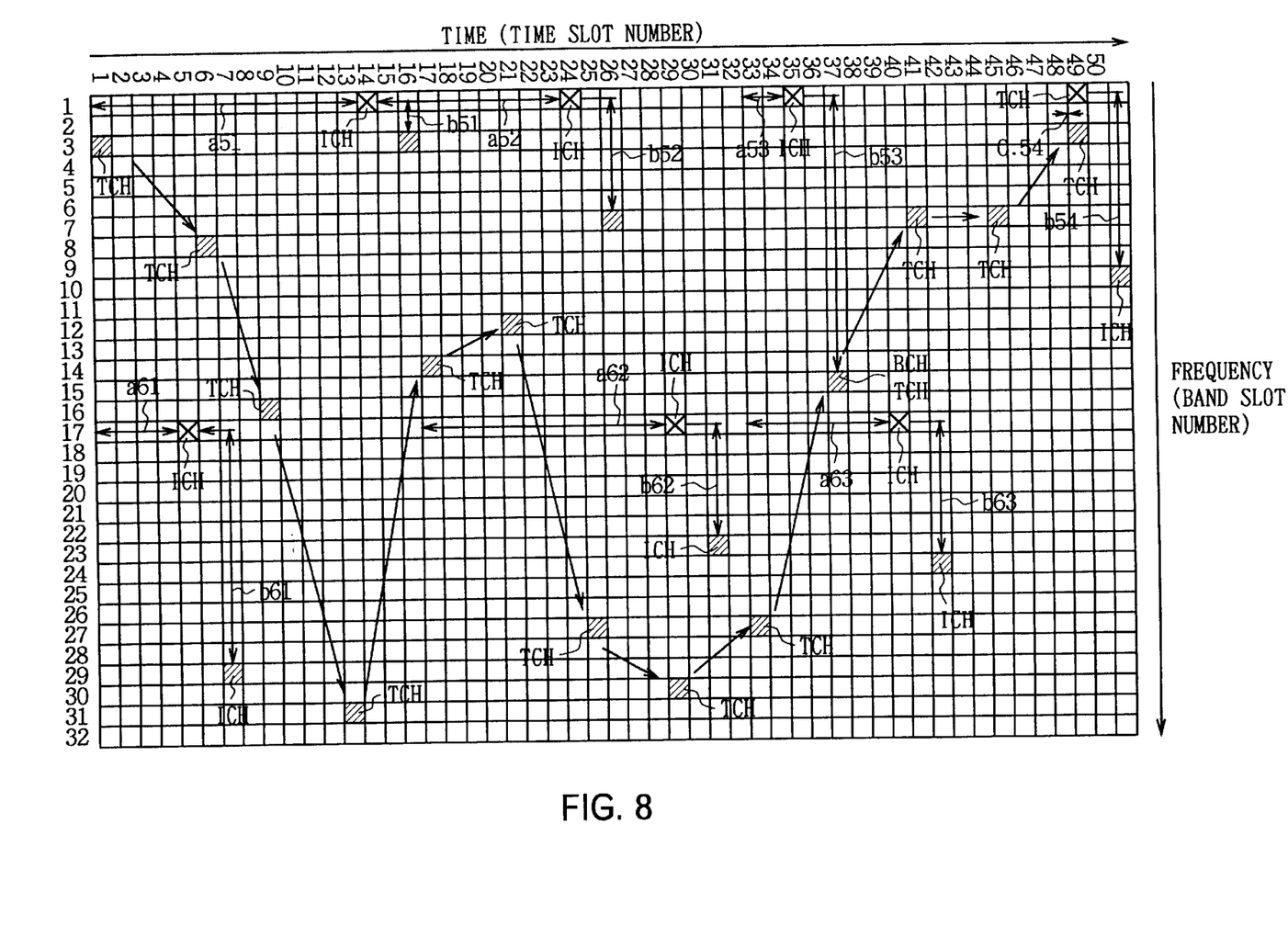
FIG. 8 is a diagram explaining the channel construction according to the second embodiment of this invention.

For example, in the case of dividing one band slot (frequency channel) into four to communicate with four terminal devices, each terminal device communicates at a period of four time slots (in the case of using another band for an up circuit). The communication of one terminal device is shown in FIG. 8. Here, the time slot numbers of the fourth band slot 1, 5, 9, 13, ... are used to communicate with the base station in the traffic channel TCH.

The wireless communication applying the TDMA method is performed in this way. However, it is a basic that the frequency channel assigned to the control channel CCH does not have the interference wave within the base station area (cell). Accordingly, it had been difficult to use the frequency of the control channel in common with the base station of adjacent cell, since the signal of control channel becomes jammed between base stations.

When the time slot period is synchronous between base stations by some methods, the time slot period in the band slot used as the control channel CCH is divided and used with the adjacent base station, so as to use the frequency channel for control channel in common between base stations. However, in order to synchronize the base stations with each other, it is needed that some synchronous data is transmitted between base stations or some standard signal (such as a position detecting signal for GPS) is received at each base station to perform the synchronization processing. There is a problem that the construction of the base station and the processing become complicated.

Further, in the wireless telephone system, when the frequency channel used as the control channel is a fixed channel, the communication may not be in favorable conditions depending on the condition of transmission path at that time since the position of the terminal device is not fixed. To avoid this problem, a plurality of frequency channels are used for the control channel, so as to obtain the frequency diversity effect and strong possibility of favorable communication. However, if a plurality of frequencies for control channel are prepared in the conventional system construction shown in FIG. 8, the frequency channel which can be used as the traffic channel TCH decreases and this is not favorable.

SUMMARY OF THE INVENTION

In view of the foregoing, an object of this invention is to efficiently set a control channel in each base station.

The foregoing object and other objects of the invention have been achieved by the provision of a communication method of forming time slots by sectioning time into every predetermined period of time and communicating between a base station and an arbitrary number of terminal devices intermittently with a predetermined number of time slot period, wherein a frequency channel for communication changes into a predetermined state in a time slot unit. The communication method comprises the steps of: providing a channel group for control information communication as a channel for transmitting from the base station, in addition to channels for information communication to communicate with the terminal devices; fixing the frequency channel, where an initial acquisition channel exists, of the channel group for control information communication to a predetermined frequency channel; in the frequency channel assigned to the initial acquisition channel, setting a time slot in which the initial acquisition information is transmitted by a predetermined random number sequence, and storing the set random number information in the initial acquisition information to be transmitted; and determining the time slot in which the initial acquisition channel is transmitted, based on the random number obtained by receiving at the terminal devices the frequency channel where the initial acquisition channel exists.

Further, this invention provides a transmitting method of forming time slots by sectioning time into every predetermined period of time and transmitting intermittently with a predetermined number of time slot period, wherein a frequency channel for transmission changes into a predetermined state in a time slot unit. The transmitting method comprises the steps of: providing a channel group for control information transmission as a channel for transmission, in addition to channels for information transmission; fixing the frequency channel, where an initial acquisition channel exists, of the channel group for control information transmission to a predetermined frequency channel; and in the frequency channel assigned to the initial acquisition channel, setting a time slot in which the initial acquisition information is transmitted by a predetermined random number sequence, and storing the set random number information in the initial acquisition information to be transmitted.

Further, this invention provides a receiving method of forming time slots by sectioning time into predetermined period of time and receiving intermittently with a predetermined number of time slot period, wherein a frequency channel for reception changes into a predetermined state in a time slot unit. The receiving method comprises the steps of: providing a channel group for control information reception as a channel for reception, in addition to channels for information reception; receiving the frequency channel, where the initial acquisition channel exists, of the channel group for control information reception by the predetermined frequency channel; and determining the time slot in which the initial acquisition channel is transmitted, by the random number included in the received frequency channel.

Further, this invention provides a base station for forming time slots by sectioning time into predetermined period of time and communicating with terminal devices intermittently with a predetermined number of time slot period, and for performing the frequency hopping that the frequency channel for communication changes into a predetermined state in a time slot unit. In the base station, processing means of a channel for information communication and processing means of a channel for control information communication are provided; an initial acquisition channel and a broadcast channel are provided as a channel group for control information communication which is transmitted by the processing means of a channel for control information communication; the initial acquisition channel is fixed to a predetermined frequency channel and transmitted; and in the frequency channel where the initial acquisition channel exists, the time slot in which the initial acquisition information is transmitted is set by a predetermined random number sequence generated by the processing means of a channel for control information communication, and the set random number information is stored in the initial acquisition information to be transmitted.

Further, this invention provides a terminal device of forming time slots by sectioning time into predetermined period of time and communicating intermittently with a predetermined number of time slot period, and of performing the frequency hopping so that the frequency channel for communication changes into a predetermined state in a time slot unit. In the terminal device, processing means of a channel for information communication and processing means of a channel for control information communication are provided; the frequency channel, where the initial acquisition channel exists, of the channel group for control information reception received by the processing means of a channel for control information communication is received in a predetermined frequency channel; and the time slot in which the initial acquisition information is transmitted is determined by the random number information included in the received frequency channel, and the time slot is received by the processing means of a channel for control information communication.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

The first embodiment of the present invention will be described hereinafter with reference to FIGS. 2 to 7.

In this embodiment, this invention is applied to the wireless telephone system of cellular system, and the construction of the communication system to which this invention is applied will be explained first. The communication system of this embodiment is constructed as a system for communicating basically by the TDMA method. A signal transmitted in each time slot is a multi-carrier signal. That is, this embodiment uses so-called multi-carrier method that a plurality of sub-carriers are continuously arranged in the band previously assigned and a plurality of sub-carriers in one band are used in one transmission path at the same time. Moreover, a plurality of sub-carriers in one band are divided by time collectively to be modulated.

Figure 4:
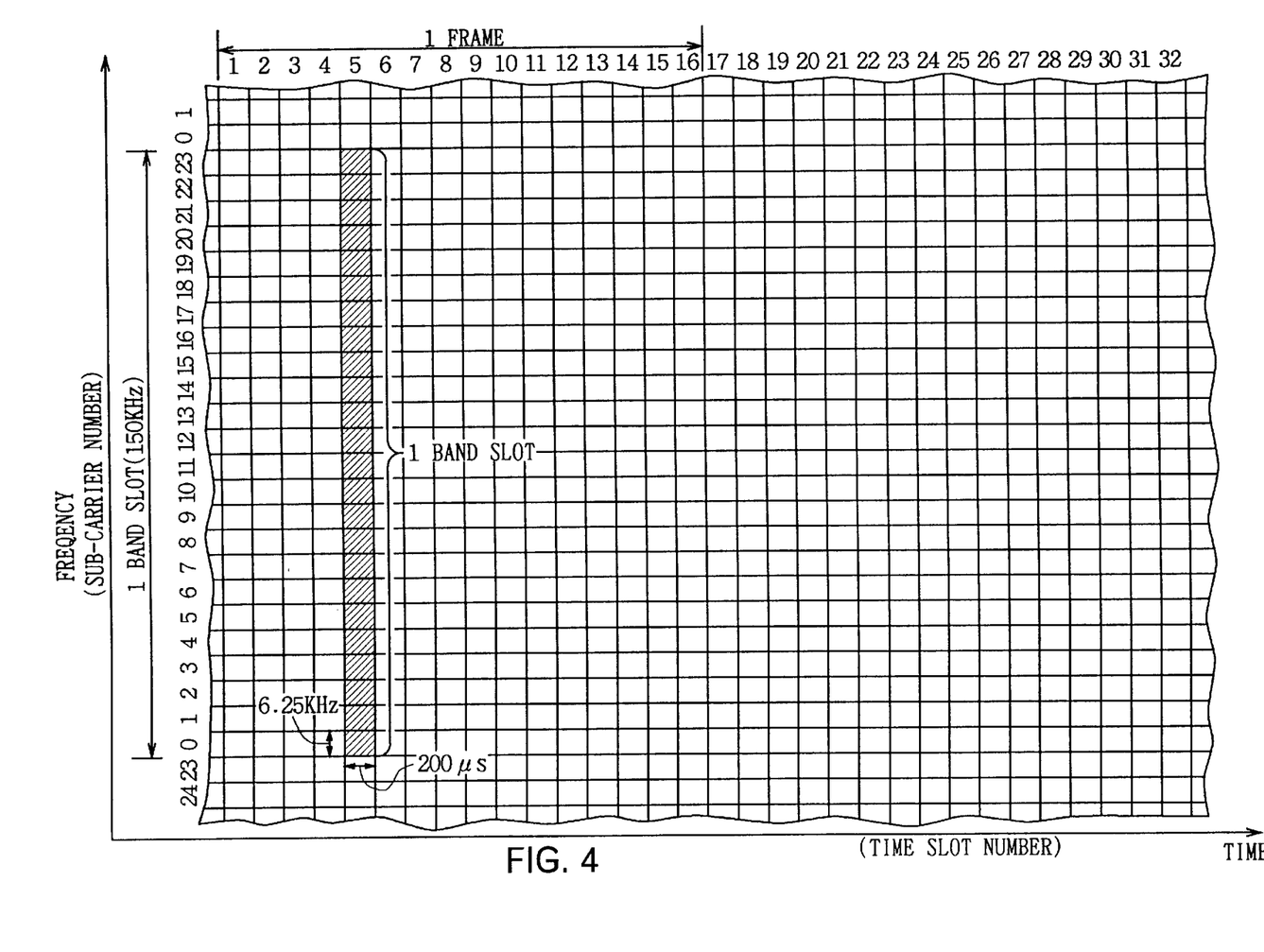
FIG. 4 is a diagram explaining the slot construction of a transmission signal according to the first embodiment of this invention.

Hereinafter, the construction of the access method will be explained. FIG. 4 is a diagram showing the slot construction of the transmission signal according to this embodiment. The ordinate represents frequency and the abscissa represents time. This embodiment provides the rectangular base so that the frequency axis and the time axis are divided like gratings. More specifically, one transmission band (one band slot) is 150 KHz, and twenty-four sub-carriers are arranged in one transmission band of 150 KHz. The twenty-four sub-carriers are successively arranged at intervals of 6.25 KHz, and the sub-carrier numbers "0" to "23" are added to respective carriers. However, actually existing sub-carriers are twenty-two which have the sub-carrier number of "1" to "22", and the sub-carrier numbers "0" and "23" at the both ends of one band slot are used as guard band which does not set up sub-carrier and whose electricity is "0". Then, data is transmitted by the phase difference between carriers of twenty-two sub-carriers, for example.

Figure 5A:
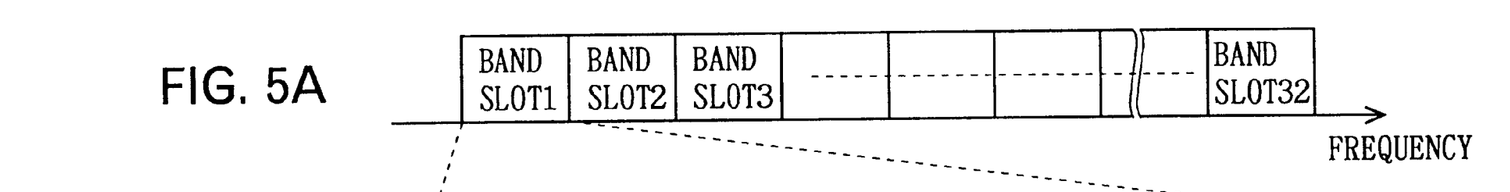
FIGS. 5A and 5B are diagrams explaining the band slot arrangement according to the first embodiment of this invention.
Figure 5B:
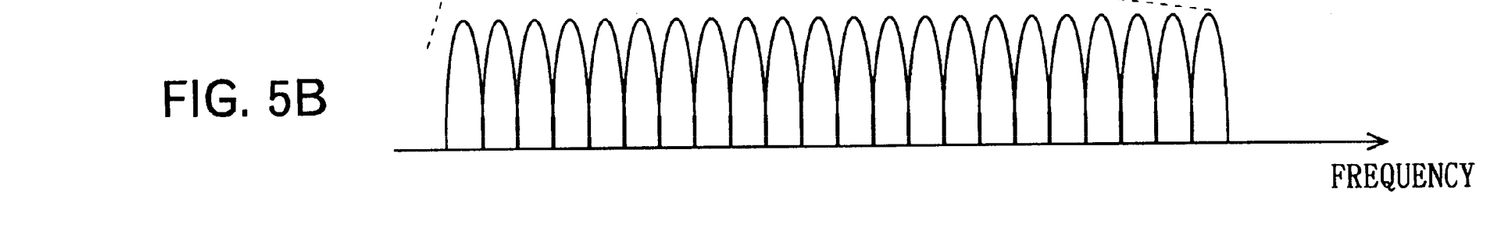

One transmission unit on the frequency is thirty-two band slots, each of band slots being constructed as described above. That is, as shown in FIG. 5A, successive thirty-two band slots are used as one transmission unit, and as shown in FIG. 5B, twenty-two multi-carrier signals are used for transmission in each band slot. The frequency channel for every sixteen band slots (i.e., two frequency channels for one transmission unit) is used as a channel for control information transmission. The transmission construction of this control information will be described later.

The construction of time axis is explained, returning to FIG. 4. The interval of 200 μsec. is defined as one time slot, and a burst signal is, after modulation, transmitted to twenty-two sub-carriers for each time slot. At this time, the condition of arranging sixteen time slots is defined as one frame. The continuous time slot numbers are added to sixteen time slots in one frame. The hatched area in FIG. 4 shows the section of one time slot of one band slot.

The rectangular base that the frequency axis and the time axis are divided like gratings is used to conduct the multiple access in which the base station communicates with a plurality of terminal devices at the same time. At this time, the band slot for communicating between the base station and each terminal device performs the frequency change processing called "frequency hopping" which changes the band slot at the next communication whenever one band slot communication is performed. That is, since the communication between the base station and each terminal device is performed at a predetermined time slot interval, the time slot period when communication is not performed at the terminal device side is used to perform the processing for changing the frequency channel (band slot) for transmission/reception in the communication circuit. The band slot is changed within the transmission frequency of one unit shown in FIGS. 5A and 5B (i.e., within thirty-two band slots). The frequency hopping makes it possible to evenly use a plurality of band slots prepared at one base station by a plurality of terminal devices which accesses to the base station. Note that although FIGS. 4, 5A and 5B have explained only the construction of a down circuit, the same construction as the down circuit is applied to an up circuit which communicates from each terminal device to the base station. however, different transmission bands are used (e.g., 2.0 GHz band in the down circuit and 2.2 GHz band in the up circuit) between the down circuit and the up circuit.

By setting the condition for communication in this way, a signal transmitted between each terminal device and the base station has the orthogonality for other signals, and only the target signal can be taken favorably without the interference with other signals. Then, the band slot for transmission is changed by the frequency hopping at any time, so that the transmission band prepared in each base station is utilized effectively, and efficient transmission can be conducted. In this case, as described above, the frequency band assigned to one base station (cell) can be assigned freely, so that the system can be flexibly set in accordance with the use condition.

Next, the construction of the base station which communicates with the terminal device using the system construction described above will be explained with reference to FIG. 2.

Figure 2:
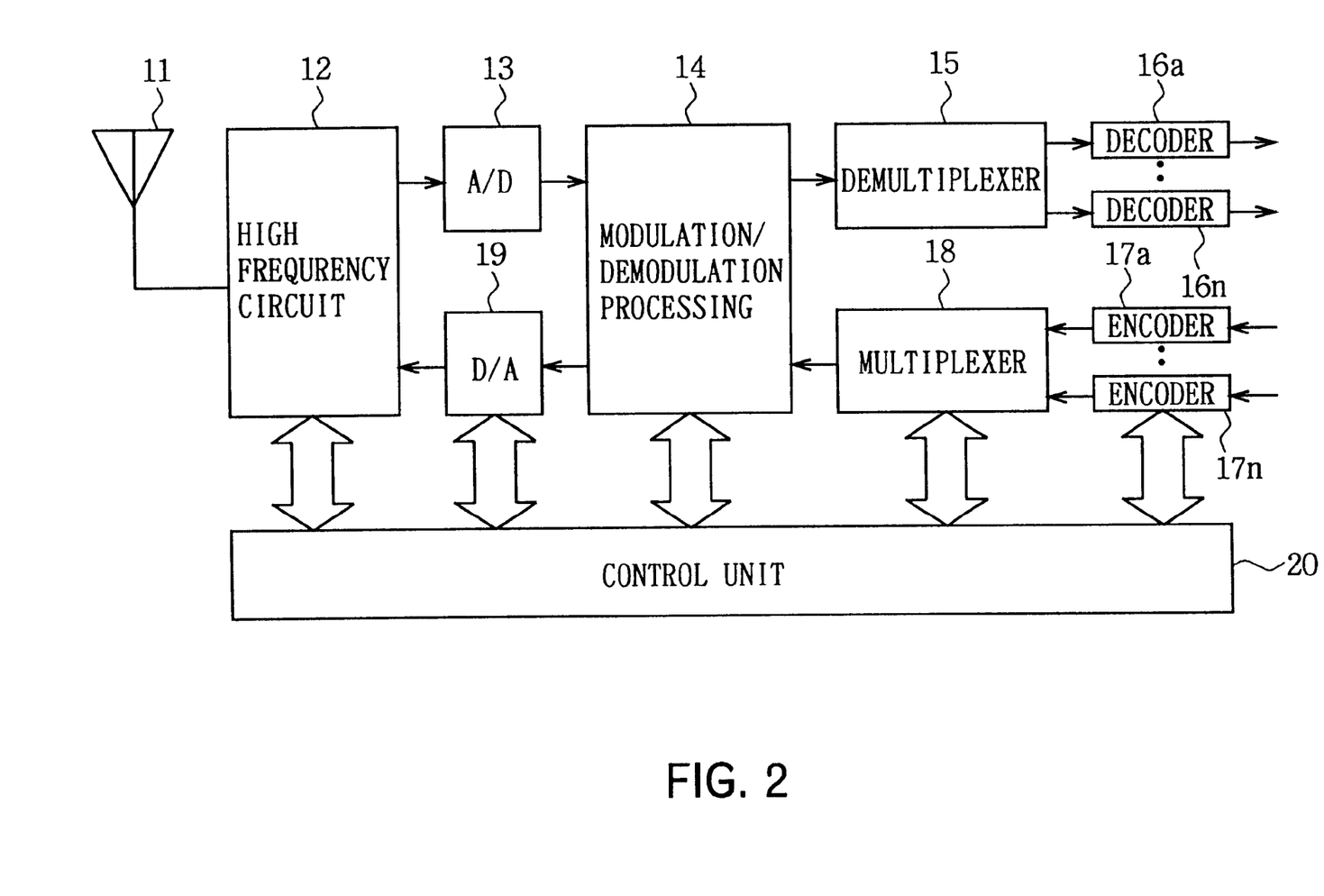
FIG. 2 is a block diagram showing the construction of a base station according to the first embodiment of this invention.

FIG. 2 is a block diagram showing the entire construction of the base station according to this embodiment. An antenna 11 for transmission and reception is connected to a high frequency circuit 12 where a signal of a predetermined frequency band received at the antenna 11 (the frequency band at this time is a signal of one transmission unit consisting of thirty-two band slots) is converted into intermediate frequency signal. The intermediate frequency signal is converted into digital data by an analog-to-digital converter 13, which is supplied to a modulation/demodulation processing unit 14. The modulation/demodulation processing unit 14 demodulates the intermediate frequency signal supplied. Here, a demodulation processing is performed, the demodulation such as the orthogonal transform that the data modulated and transmitted after being divided into twenty-two sub-carriers which has been explained in the transmission method is converted into one sequence of data. Then, the demodulated data is supplied to a demultiplexer 15 where the data is separated for each data transmitted from each terminal device and respectively supplies the separated data to decoders 16a, 16b, . . . , 16n ("n" is arbitrary number). At the time of separation in the demultiplexer 15, the frequency position (band slot) to be divided is changed at any time and respectively supplied to the decoders 16a to 16n, considering the frequency hopping described above.

The decoders 16a to 16n are prepared for the number corresponding to the number of terminal devices which can access to one base station at the same time. The decoders 16a to 16n decode the data supplied from the terminal device. Then, the data decoded by each of decoders 16a to 16n is supplied to another communication system (not shown) which has been accessed to the base station, and transmitted to the partner which has been accessed to the terminal device via the telephone circuit. However, the control data such as access request transmitted from the terminal device to the base station is supplied to a control unit 20 of the base station, after being decoded by any of decoders 16a to 16n.

Next, the construction of the transmission system of the base station will be explained. The data transmitted individually from the partner to the base station for each terminal device to be accessed are respectively supplied to encoders 17a, 17b, 17n ("n" is arbitrary number). The encoders 17a to 17n are prepared for the number corresponding to the number of terminal devices which can access to one base station at the same time, similarly to the decoder. The encoders 17a to 17n encode the supplied data. Then, the data encoded by each of encoders 17a to 17n is supplied to a multiplexer 18 where all of transmission data to be processed by the base station are set to one sequence of transmission data, which is transmitted to the modulation/demodulation processing unit 14. The modulation/demodulation processing unit 14 disperses the supplied data into twenty-two sub-carriers and modulates them. The modulated data are supplied to a digital-to-analog converter 19 where the data is converted into an analog signal, which is supplied to the high frequency circuit 12. The high frequency circuit 12 frequency converts the analog signal into a signal of a predetermined frequency band (the frequency band at this time is a signal of one transmission unit consisting of thirty-two band slots), and the signal is wireless transmitted from the antenna 11. In this connection, the control data transmitted from the control unit 20 of the base station to the terminal device is also supplied to any of encoders 17a to 17n to be encoded, and thereafter the transmission processing is performed on the control data at the transmission system from the multiplexer 18 to the high frequency circuit 12, so as to be wireless transmitted.

The base station wireless communicates with the terminal device with the construction described above. The communication is controlled by the control unit 20 of the base station. The control unit 20 is composed of control means such as a microcomputer, and the control data generated by the control unit 20 is wireless transmitted, so that the communication with each terminal device is controlled. The random number sequence used for transmission processing of the control information described later is generated by a random number generating unit (not shown) in the control unit 20. The random number generating unit uses a circuit (such as M-sequence shift resistor) for generating PN code having a predetermined bit number (e.g., sixteen bits), and changes the phase (the position of head bit) of generated PN code at any time to change the random number to be generated.

Next, the construction of the terminal device for wireless communicating with the base station will be explained with reference to FIG. 3.

Figure 3:
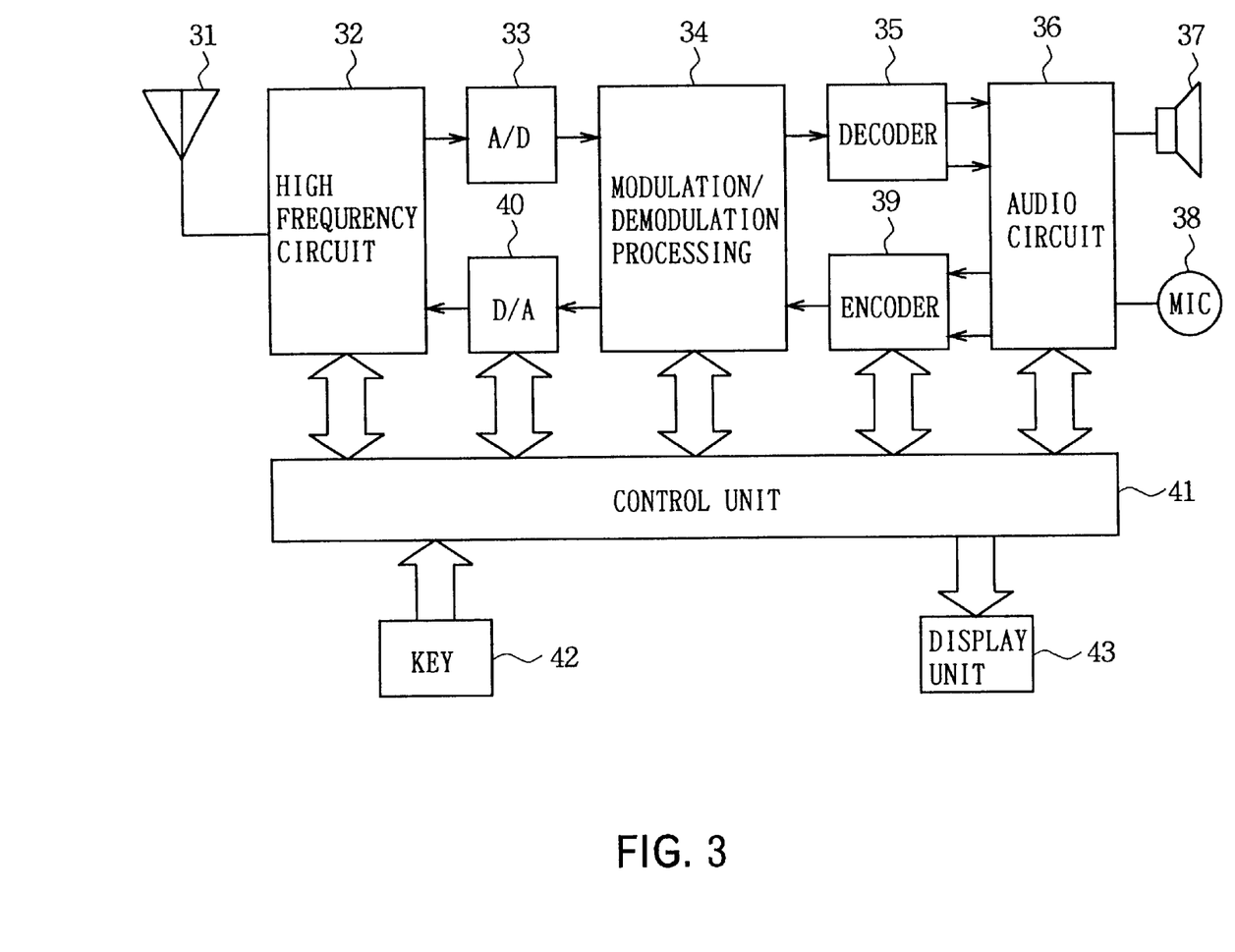
FIG. 3 is a block diagram showing the construction of a terminal device according to the first embodiment of this invention.

FIG. 3 is a block diagram showing the entire construction of the terminal device according to this embodiment. An antenna 31 for transmission and reception is connected to a high frequency circuit 32 where a signal of a predetermined frequency band received at the antenna 31 (the frequency band at this time is a signal of one band slot) is converted into intermediate frequency signal. The intermediate frequency signal is converted into digital data by an analog-to-digital converter 33, which is supplied to a modulation/demodulation processing unit 34. The modulation/demodulation processing unit 34 demodulates the intermediate frequency signal supplied. Here, a demodulation processing is performed, the demodulation such as the orthogonal transform that the data modulated and transmitted after being divided into twenty-two sub-carriers which has been explained in the transmission method is converted into one sequence of data. Then, the demodulated data is supplied to a decoder 35 where the data to be transmitted from the base station is decoded. The data decoded by the decoder 35 is supplied to an audio processing circuit 36 where the audio data for communication is processed and the obtained audio signal is output from a speaker 37. Further, if the decoded data is the control data from the base station, it is supplied to the control unit 41 of the terminal device.

Next, the construction of the transmission system of the terminal device will be explained. If the data to be transmitted is voice for communication, the audio signal picked up by a microphone 38 is supplied to the audio processing circuit 36 where it is converted into audio data of a predetermined method. The audio data is supplied to an encoder 39 to be encoded. Then, the data encoded by the encoder 39 is supplied to the modulation/demodulation processing unit 34. The modulation/demodulation processing unit 34 disperses the supplied data into twenty-two sub-carriers and modulates them. The modulated data are supplied to a digital-to-analog converter 40 where the data is converted into an analog signal, which is supplied to the high frequency circuit 32. The high frequency circuit 32 frequency converts the analog signal into a signal of a predetermined frequency band, and the signal is wireless transmitted from the antenna 31. In this connection, the control data such as access request to be transmitted from the control unit 41 of the terminal device to the base station is also supplied to the encoder 39 to be encoded, and thereafter the transmission processing is performed on the control data at the transmission system from the modulation/demodulation processing unit 34 to the high frequency circuit 32, so as to be wireless transmitted.

The condition of reception and transmission at the terminal device is controlled by the control unit 41 which is composed of control means such as a microcomputer. The control unit 41 determines the control data transmitted from the base station to judge the frequency channel for transmission and reception (band slot) and the transmission and reception timing (i.e., time slot for transmission and reception) at the frequency channel, so as to control each part of the terminal device to perform a processing corresponding to the condition. Further, the operation information is supplied from a key 42 such as dial key to the control unit 41. Moreover, a display unit 43 composed of a liquid crystal display panel is connected to the control unit 41 to display the operation state.

The terminal device shown in FIG. 3 for transmitting and receiving the audio data for communication has been explained. however, the terminal device for transmitting or receiving other various data can be constructed. For example, the terminal device for transmitting and receiving any character data or numeric data, and for transmitting or receiving data such as E-mail and Internet can be constructed.

Figure 6:
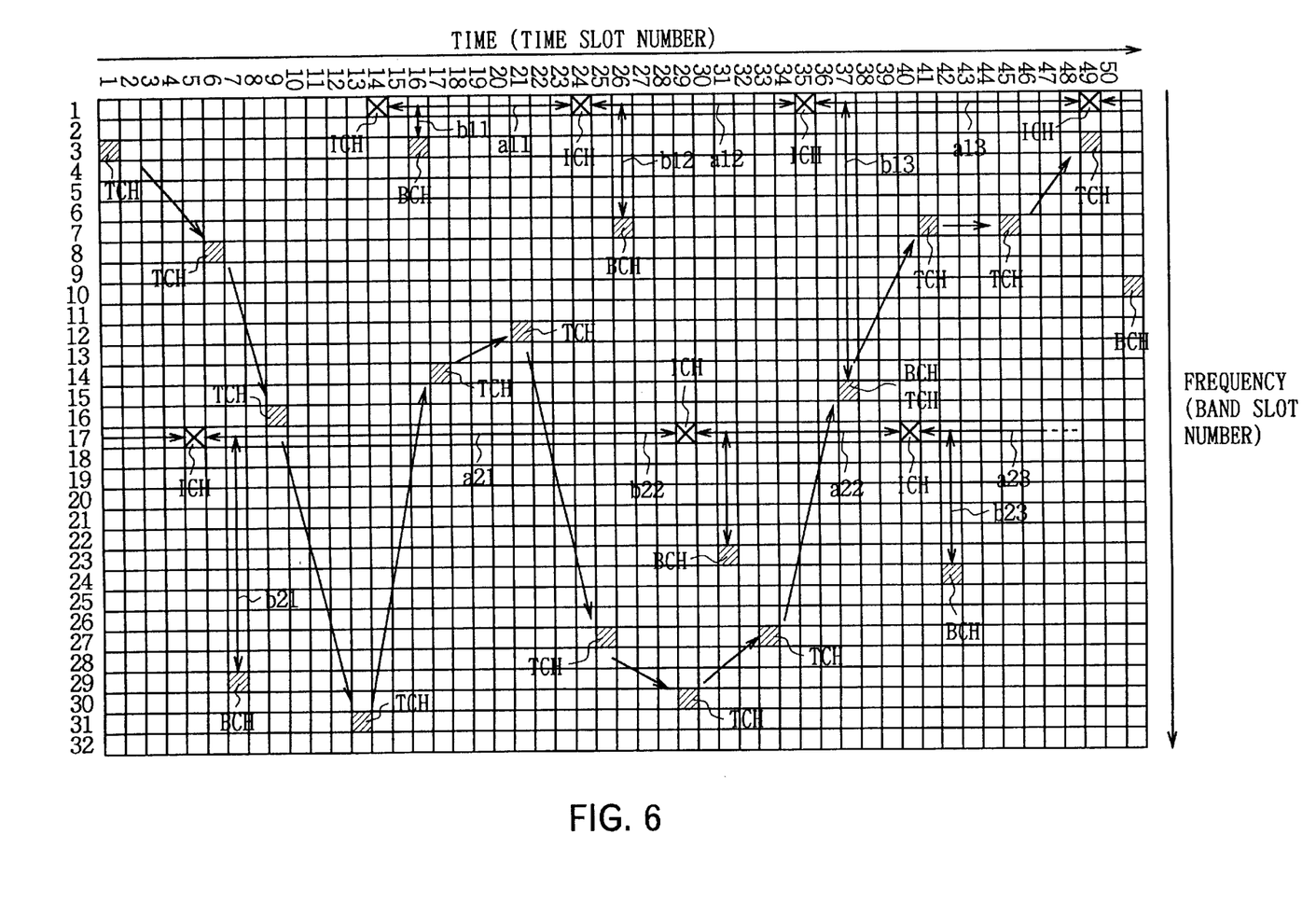
FIG. 6 is a diagram explaining the channel construction according to the first embodiment of this invention.

Next, the state of communicating between the base station and the terminal device constructed as described above will be explained with reference to FIGS. 6 and 7. FIG. 6 is a diagram showing the channel construction of one unit transmission band (thirty-two band slots) of a down circuit to the terminal device according to this embodiment, which is handled by the base station. The ordinate represents frequency by band slot number and the abscissa represents the passage of time by time slot number, in which the continuous numbers are added to the band slots and the time slots.

Here, one band slot of every sixteen band slots (i.e., the first band slot and the seventeenth band slot) is used as a channel for control information communication only. However, in this embodiment, the initial acquisition channel ICH and the broadcast channel BCH are prepared as a control information channel group which is transmitted from the base station. In the frequency channel of the first band slot and the seventeenth band slot, only the initial acquisition channel ICH is transmitted. The broadcast channel BCH and the traffic channel TCH are transmitted on the other band slots (the second to sixteenth band slots and the eighteenth to thirty-second band slots).

The initial acquisition channel ICH transmitted in the first band slot and the seventeenth band slot for control information communication only is not transmitted in all of time slots, and it is data transmitted for one time slot period, once in sixteen time slots, when taking an average. The time slot for transmission is set by the random number using the random number sequence generated by the control unit 20 of the base station.

In FIG. 6, in the frequency channel of the first band slot, during the period of first sixteen time slots (the period of time slot numbers 1 to 16), the data of initial acquisition channel ICH is transmitted from the base station in the band slot number 14. During the period of next sixteen time slots (the period of time slot numbers 17 to 32), the data of initial acquisition channel ICH is transmitted from the base station in the band slot number 24. During the period of next sixteen time slots (the period of time slot numbers 33 to 48), the data of initial acquisition channel ICH is transmitted from the base station in the band slot number 35.

To the data of initial acquisition channel ICH of one time slot period, data of band slot number in which the broadcast channel BCH will be transmitted next and data of time slot number in which the initial acquisition channel ICH will be transmitted next are added, in addition to the synchronous data necessary to acquire the data of the initial acquisition channel ICH in the terminal device. The data of band slot number in which the broadcast channel BCH will be transmitted next and the data of time slot number on which the initial acquisition channel ICH will be transmitted next are generated by using the random number based on the random number sequence generated in the control unit 20 of the base station.

The broadcast channel BCH is transmitted after two time slots of the period that the initial acquisition channel ICH is transmitted. The band slot number of the broadcast channel BCH transmitted at the timing is shown by the data of the random number added to the initial acquisition channel ICH. It is only natural that the broadcast channel BCH transmitted from the transmission system of the base station is set by the band slot shown by the data of the random number. Various data necessary to be transmitted to the terminal device is included in the data transmitted by the broadcast channel BCH. More specifically, the information are transmitted such as information of assigning a traffic channel TCH necessary to set the wireless communication circuit, information necessary to release the circuit, and information necessary to hand-off for changing the base station for communication into other base station. However, in this embodiment, even when the data of the broadcast channel BCH can not be received at the terminal device side during a comparatively short period of one time slot, the data transmitted in the broadcast channel BCH is constructed not to have a problem.

In the data of the transmission time slot number of next initial acquisition channel ICH included in the initial acquisition channel ICH, the data of the time slot period till the initial acquisition channel ICH is transmitted next is designated. It is only natural that the initial acquisition channel ICH transmitted from the transmission system of the base station next is set to the timing shown by the data of the random number.

Figure 7:
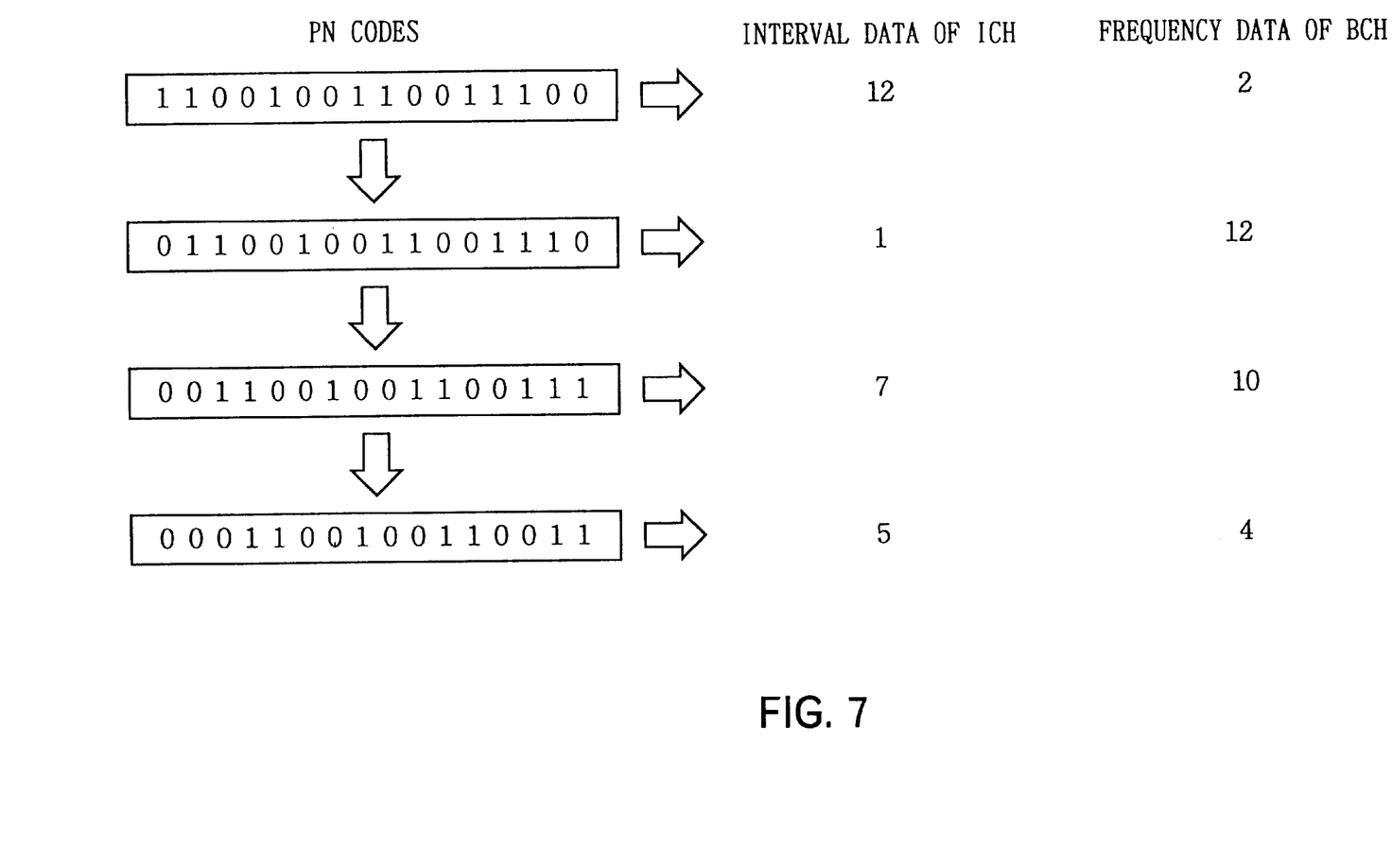
FIG. 7 is a diagram explaining an example of the control channel data according to the first embodiment of this invention.

FIG. 7 is a diagram showing an example of correspondence between the period (transmission interval) data of the initial acquisition channel ICH and the band slot (transmission frequency) data of the broadcast channel BCH. Whenever the data of initial acquisition channel ICH is transmitted, the head position of PN code of sixteen bits which is a random number sequence is shifted one bit by one bit. The shifted 16-bit data is added to the initial acquisition channel ICH as random number data.

The position of the transmission time slot of next initial acquisition channel ICH is represented by the data of a predetermined bit position in the random number data of sixteen bits, and the position of the band slot of broadcast channel BCH is represented by the data of another predetermined bit position.

In FIG. 6, the transmission interval data a11, a12, a13 . . . of next initial acquisition channel ICH are successively added to each one time slot period of the initial acquisition channel ICH transmitted to the band slot number 1, and the frequency interval data b11, b12, b13 . . . between the band slots of the initial acquisition channel ICH and the broadcast channel BCH which is transmitted after two time slots from each initial acquisition channel ICH are successively added. Similarly, the transmission interval data a21, a22, a23 . . . of next initial acquisition channel ICH are successively added to each one time slot period of the initial acquisition channel ICH transmitted to the band slot number 17, and the frequency interval data b21, b22, b23 . . . between the band slot of the initial acquisition channel ICH and the band slot of the broadcast channel BCH which is transmitted after two time slots from each initial acquisition channel ICH are successively added.

In addition, regarding the traffic channel TCH for transmitting various data between the base station and the terminal device, as shown in one example of FIG. 6 (communication between the base station and one terminal device), one time slot period is set with four time slot periods. The different band slot is used for each time slot period by the frequency hopping processing in accordance with a predetermined rule. The band of the second to sixteenth band slots and the eighteenth to thirty-second band slots are used evenly. The band slot in which the broadcast channel BCH is transmitted is the position apart from the initial acquisition channel ICH for fifteen band slots at maximum (e.g., the frequency position of the broadcast channel BCH represented by the initial acquisition channel ICH transmitted in the first band slot is any of the second band slot to the sixteenth band slot).

The control information is transmitted from the base station to the terminal device by such construction and processing, so as to transmit the control information to each terminal device efficiently. More specifically, the terminal device firstly receives the band slot in which the initial acquisition channel ICH is transmitted so as to acquire the initial acquisition channel ICH, the slot position in which the broadcast channel BCH is transmitted is obtained and the broadcast channel BCH is received to perform the corresponding control processing. Also, the timing that the initial acquisition channel ICH is transmitted next can be obtained.

In addition, if the same circuit (such as shift resistor) as the generating circuit for generating the random number sequence at the base station is also provided at the terminal device, the initial acquisition channel ICH is once received and the phase of the received random number sequence is judged at the terminal device, so that the random number included in the initial acquisition channel ICH can be estimated at each timing by the random number generated by the circuit, if the initial acquisition channel ICH is not received actually. Thereby, the slot position in which the broadcast channel BCH is transmitted can be obtained and the control data can be received correctly to synchronize with the base station.

Here, in the case where a plurality of random number sequence to be generated at the base station exist in the wireless telephone system, the type data of circuit used for generating the random number is added to the random number data transmitted from the base station, so that the terminal device can generate the random number which is synchronous with the base station and the random number included in the initial acquisition channel ICH can be estimated at each timing to synchronize with the base station.

In this embodiment, since the initial acquisition channel ICH is transmitted in the band slot prepared for the initial acquisition channel ICH at a timing set at random, even if the same frequency is used in the base station of adjacent cell to transmit the initial acquisition channel ICH, it is hardly possible that the initial acquisition channel ICH is transmitted from respective base stations at the same time. Then, the control channel can be used in each cell commonly and the frequency construction of each cell can be used in common. In this case, it is unnecessary to synchronize the base station of cells with each other and the base stations can be utilized with non-synchronization.

In addition, the broadcast channel BCH and the traffic channel TCH are transmitted in the same band. Thereby, although the broadcast channel BCH overlaps with the traffic channel TCH in the time slot number 37 of the fifteenth band slot in FIG. 6, the probability of this overlap is very slight so that this is not a problem upon operating the system.

Further, in FIG. 6, the number of band slot of one unit transmission band is "32", and the control data is transmitted once for sixteen time slots. However, the control data can be transmitted at other intervals. In this case, if the interval of the control data is not fixed depending on the base station, the data representing the appearance frequency of the control data is added to the initial acquisition channel ICH so that the terminal device may determine the frequency channel where the initial acquisition channel ICH exists.

Further, when a plurality of band slots for initial acquisition channel ICH are prepared in one base station (e.g., the first band slot and the seventeenth band slot in FIG. 6), it is preferable to offset the phase of the random number sequence to be used (such as the position of head bit) for each frequency position (band slot) in the band slot of each ICH. Thereby, the control data such as ICH is transmitted evenly in each band slot to transmit the control data favorably.

Next, the second embodiment according to this invention will be explained with reference to FIG. 8. In the second embodiment, the transmission construction of the control data from the base station is different from that of the first embodiment. Other construction is same as that of the first embodiment, and the explanation is omitted.

FIG. 8 is a diagram showing the channel construction of one unit transmission band (thirty-two band slots) of a down circuit to the terminal device which is treated at the base station in this example. The ordinate represents frequency by band slot number and the abscissa represents the passage of time by time slot number, in which the continuous numbers are added to the band slots and the time slots.

Also, one band slot of every sixteen band slots (i.e., the first band slot and the seventeenth band slot) is used as a channel for initial acquisition channel only. The broadcast channel BCH and the traffic channel TCH are transmitted on the other band slots (the second to sixteenth band slots and the eighteenth to thirty-second band slots).

The initial acquisition channel ICH transmitted in the first band slot and the seventeenth band slot for control information communication only is, similarly to the case of the first embodiment, data transmitted for one time slot period, once in sixteen time slots, when taking an average. The time slot to be transmitted is set by the random number using the random number sequence generated by the control unit 20 of the base station.

Here, in this example, the data representing the time slot position in which the initial acquisition channel ICH is transmitted, which is the data represented by the random number, are added. This shows the interval from the start of one frame in this case. More specifically, one frame is composed of sixteen time slots as a unit, and the data of each initial acquisition channel ICH designates the position in one frame (data a51, a52, a53, a54 . . . in FIG. 8) of the time slot position in which the initial acquisition channel ICH is transmitted. The frequency position data of the broadcast channel BCH is the same as that of the first embodiment described above.

By constructing in this way, the initial acquisition channel ICH is received once at the terminal device so as to detect the frame timing, and easily conduct the frame synchronization. The generating means of the random number sequence prepared in the terminal device is synchronous with the random number of the base station, so that the position of the following initial acquisition channel ICH and the broadcast channel BCH can be obtained. Thereby, the same communication control as that of the first embodiment can be performed and the same effect can be obtained.

In addition, in the embodiments described above, one example of the communication or frame construction has been described in details, and this invention is not limited to this. Specially, in the embodiments described above this invention has been applied to the case where the multi-carrier signal is transmitted. However, the control processing according to this invention can be applied to various communications of TDMA method performing the frequency hopping. Further, in the embodiments this invention has been applied to the wireless telephone system of cellular system, but can be also applied to the control of other communication systems.

According to the communication method described in claim 1, the frequency channel, where an initial acquisition channel exists, of the channel group for control information communication is fixed to a predetermined frequency channel, and in the frequency channel assigned to the initial acquisition channel, a time slot in which the initial acquisition information is transmitted is set by a predetermined random number sequence to store the set random number information in the initial acquisition information to be transmitted. Thereby, when the terminal device side is synchronous with the base station, the frequency channel where the initial acquisition channel exists in received to determine the random numbers stored in the initial acquisition information, so that the following time slot in which the initial acquisition channel exists can be determined even if the time slot of the initial acquisition channel is transmitted from the base station intermittently. Each terminal device can be synchronous with the base station even if the intermittent control information is transmitted because of using in common the channel for control information at a plurality of cells.

According to the communication method described in claim 2, the plural number of frequency channels where the initial acquisition channel exists are positioned in a transmission frequency band assigned to the base station at the same frequency intervals, and the phase of a predetermined random number sequence for setting the time slot is offset for each frequency channel. Thereby, all frequency channels where the initial acquisition information exists are used evenly, so as to transmit the control information favorably.

According to the communication method described in claim 3, the frequency channel or the time slot, where the broadcast channel exists, of the channel group for control information communication is set by the random number stored in the initial acquisition channel, so as to determine the position of the frequency channel or the time slot of the broadcast channel, by receiving the initial acquisition information at the terminal device. Even when performing the processing for changing the position of the frequency channel and the time slot of the broadcast channel, the broadcast channel can be received favorably.

According to the communication method described in claim 4, information representing the appearance frequency of the initial acquisition channel is added to the initial acquisition information of the initial acquisition channel, and all frequency channels where the initial acquisition channel exists are determined, by the information representing the appearance frequency obtained by receiving at the terminal devices the frequency channel where the initial acquisition channel exists. Thereby, this invention can be applied to the communication system which changes the channel number for each base station.

According to the communication method described in claim 5, a signal transmitted from a base station at the time slot is a multi-carrier signal in which a plurality of sub-carrier signals mare arranged on one frequency channel and information dispersed to a plurality of sub-carrier signals is modulated, and information dispersed to a plurality of sub-carriers and modulated is demodulated in the terminal device. Thereby, the transmission by the multi-carrier signal can be controlled efficiently.

According to the transmitting method described in claim 6 and the base station using the transmitting method described in claim 15, the frequency channel, where an initial acquisition channel exists, of the channel group for control information transmission is fixed to a predetermined frequency channel, and in the frequency channel assigned to the initial acquisition channel, the time slot in which the initial acquisition information is transmitted is set by a predetermined random number sequence to store the set random number information in the initial acquisition information to be transmitted. Thereby, at a receiving side for control information, the frequency channel where the initial acquisition channel exists is received to determined the random number stored in the initial acquisition information, so that if the time slot of the initial acquisition channel is transmitted intermittently, the terminal device can judge the following time slot where the initial acquisition channel exists. Then, the time slot of the initial acquisition channel is set at an intermittent timing, so as to use in common the channel for control information by a plurality of cells.

According to the transmitting method described in claim 7 and the base station using the transmitting method described in claim 16, the frequency channels where the initial acquisition channel exists are positioned in a transmission frequency band assigned to one station at the same frequency intervals, and the phase of a predetermined random number sequence for setting the time slot is offset for each frequency channel. Thereby, all frequency channels where the initial acquisition information exists, which are prepared for each base station, are used evenly so as to transmit the control information favorably.

According to the transmitting method described in claim 8 and the base station using the transmitting method described in claim 17, the frequency channel or the time slot to be transmitted as a broadcast channel of the channel group for control information communication is designated by the random number. Thereby, the broadcast channel for control information communication can be assigned to an arbitrary frequency channel or time slot so as to transmit the control information in the random frequency or time slot.

According to the transmitting method described in claim 9 and the base station using the transmitting method described in claim 18, information representing the appearance frequency of the initial acquisition channel is added to the initial acquisition information of the initial acquisition channel. Thereby, by only changing the information representing the appearance frequency of the initial acquisition channel, the control information can be used also in the communication system in which the number of channels is changed for each base station.

According to the transmitting method described in claim 10 and the base station using the transmitting method described in claim 19, a signal transmitted by the time slot is a multi-carrier signal in which a plurality of sub-carrier signals are arranged on one frequency channel and information dispersed to a plurality of sub-carrier signals is modulated. Thereby, the transmission by the multi-carrier signal can be controlled efficiently.

According to the receiving method described in claim 11 and the terminal device using the receiving method described in claim 20, in the receiving method of forming time slots by sectioning time into predetermined period of time and receiving intermittently with a predetermined number of time slot period, in which a frequency channel for receiving changes to a predetermined condition in a time slot unit, a channel group for control information reception is provided as a channel for reception, in addition to channels for information reception; the frequency channel, where the initial acquisition channel exists, of the channel group for control information reception is received by the predetermined frequency channel; and the time slot in which the initial acquisition channel is transmitted is determined by the random numbers included in the received frequency channel. Thereby, even if the time slot of the initial acquisition channel is transmitted intermittently from the base station, the time slot where the following initial acquisition channel exists can be determined.

According to the receiving method described in claim 12 and the terminal device using the receiving method described in claim 21, the frequency channel or the time slot where the broadcast channel exists is determined, based on the random number obtained by receiving the frequency channel where the initial acquisition channel exists. Thereby, only the initial acquisition channel is received to obtain the broadcast channel, so that even if the transmission frequency and the time slot position of the broadcast channel are changed, it can be received efficiently.

According to the receiving method described in claim 13 and the terminal device using the receiving method described in claim 22, all frequency channels where the initial acquisition channel exists are determined, by the information representing the appearance frequency obtained by receiving the frequency channel where the initial acquisition channel exists. Thereby, the receiving side can deal with the communication system in which the number of channels is changed at the transmitting side.

According to the receiving method described in claim 14 and the terminal device using the receiving method described in claim 23, a plurality of sub-carrier signals in one frequency channel are received, and information dispersed to a plurality of sub-carrier signals and modulated is demodulated. Thereby, the reception by the multi-carrier signal can be controlled efficiently.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communication method of forming a plurality of frequency channels by sectioning a selected frequency band provided for the communication, of forming a plurality of time slots by sectioning time into predetermined periods of time, and of communicating intermittently between a base station and an arbitrary number of terminal devices in a frequency hopping sequence, said communication method comprising the steps of:

at said base, generating a random number sequence;

allocating a first control channel to a time slot designated in accordance with the generated random number sequence in a predetermined frequency channel among the plurality of frequency channels;

allocating a second control channel to a frequency channel designated in accordance with the generated random number sequence in a time slot located in a predetermined relation to said first control channel;

providing said first control channel with the information of the generated random number sequence;

providing said second control channel with information for allocating an information transmitting channel to the time slots; and transmitting the control information including said first control channel and said second control channel; and at said terminal device:

receiving said control information transmitted from said base station;

determining the time slot wherein said first control channel exists in accordance with the information included in said first control channel; and determining the frequency channel wherein said second control channel exists.

2. The communication method according to claim 1, wherein a plurality of frequency channels wherein said first control channel exists are positioned in the selected frequency band provided for communication at equal frequency intervals, and a phase of said generated random number sequence is offset for each of said plurality of frequency channels.

3. The communication method according to claim 1, wherein a signal transmitted from said base station at said time slots is a multi-carrier signal wherein a plurality of sub-carrier signals are arranged on one frequency channel and information dispersed to said plurality of sub-carrier signals is modulated and information dispersed to said plurality of sub-carrier signals is demodulated in said terminal device.

4. A transmitting method of forming a plurality of frequency channels by sectioning a selected frequency band provided for communication, of forming time slots by sectioning time, into predetermined periods of time, and of transmitting intermittently to an arbitrary number terminal devices in a frequency hopping sequence, said transmitting method comprising the steps of:

generating a random number sequence;

allocating a first control channel to a time slot designated in accordance with the generated random number sequence in a predetermined frequency channel from among said plurality of frequency channels;

allocating a second control channel to a frequency channel designated in accordance with the generated random number sequence in a time slot located in a predetermined relation to said first control channel;

providing said first control channel with the information of the generated random number sequence;

providing said second control channel with the information for allocating the information transmitting channel to the time slots; and transmitting the control information including said first and second control channels.

5. The transmitting method according to claim 4, wherein a plurality of frequency channels wherein said first control channel exists are positioned in the selected frequency band provided for communication at equal frequency intervals, and a phase of said generated random number sequence is offset for each of said plurality of frequency channels.

6. The transmitting method according to claim 4, wherein a signal transmitted at said time slots is a multi-carrier signal wherein a plurality of sub-carrier signals are arranged on one frequency channel and information dispersed to said plurality of sub-carrier signals is modulated.

7. A base station for forming a plurality of frequency channels by sectioning a selected frequency band provided for communication, for forming a plurality of time slots by sectioning time into predetermined periods of time, for communicating intermittently with an arbitrary number of terminal devices in frequency hopping sequence, said base station comprising:

means for selecting a frequency channel from among said plurality of frequency channels;

means for generating a random number sequence;

means for allocating a first control channel to a time slot designated in accordance with the generated random number sequence in the selected frequency channel;

means for allocating a second control channel to a frequency channel designated in accordance with the generated random number sequence in a time slot located in a predetermined relation to said first control channel;

means for providing said first control channel with the information of the generated random number sequence;

means for providing said second control channel with the information for allocating an information transmitting channel to the plurality of time slots; and means for transmitting the control information including the first and second control channels.

8. The base station according to claim 7, wherein said means for selecting a frequency channel selects a plurality of frequency channels wherein said first control channel exists and said plurality of frequency channels are allocated at equal frequency intervals in the selected frequency band and a phase of said random number sequence is offset for each of said plurality of frequency channels.

9. The base station according to claim 7, wherein said means for transmitting arranges a plurality of sub-carrier signals in one frequency channel and disperses the information into said plurality of sub-carrier signals and thereafter modulates the dispersed information.

10. A terminal device for forming a plurality of frequency channels by sectioning a selected frequency band provided for communication, for forming a plurality of time slots by sectioning time into predetermined periods of time, and for communicating intermittently with a a base station in frequency hopping sequence, wherein said base station generates a random number sequence, allocates a first control channel to a time slot designated in accordance with the generated random number sequence in a predetermined frequency channel among the plurality of frequency channels, allocates a second control channel to a frequency channel designated in accordance with the generated random number sequence in a time slot located in a predetermined relation to said first control channel, provides said first control channel with the information of the random number sequence, provides said second control channel with the information for allocating an information transmitting channel to the plurality of time slots, and transmits control information including said first control channel and said second control channel, said terminal device comprising:

first channel processing means for information communication; and second channel processing means for control information communication, wherein said second channel processing means receives said control information from said base station, determines the time slot wherein said first control channel exists in accordance with the information included in said first control channel, and determines the frequency channel wherein said second control channel exists.

11. The terminal device to claim 10, wherein at said first channel processing means for said information communication and said second channel processing means for said control information communication, as a reception processing, a plurality of sub-carrier signals in one frequency channel are received and information dispersed to said plurality of sub-carrier signals is demodulated.

* * * * *